US009355117B1

(12) United States Patent
Brocco et al.

(10) Patent No.: US 9,355,117 B1
(45) Date of Patent: May 31, 2016

(54) TECHNIQUES FOR BACKING UP REPLICATED DATA

(75) Inventors: Matthew W. Brocco, DeBary, FL (US); Christopher Greene, Longwood, FL (US); Roland Whatcott, Salem, UT (US)

(73) Assignee: Veritas US IP Holdings LLC, Mountain View, CA (US)

( * ) Notice: Subject to any disclaimer, the term of this patent is extended or adjusted under 35 U.S.C. 154(b) by 1477 days.

(21) Appl. No.: 12/059,475

(22) Filed: Mar. 31, 2008

(51) Int. Cl.
*G06F 7/00* (2006.01)
*G06F 17/00* (2006.01)
*G06F 17/30* (2006.01)

(52) U.S. Cl.
CPC .................... *G06F 17/30194* (2013.01)

(58) Field of Classification Search
CPC ............. G06F 17/30097; G06F 17/30194; G06F 17/30073; G06F 17/3012
USPC .............. 707/204; 714/13, 38, 26; 370/428; 712/13
See application file for complete search history.

(56) References Cited

U.S. PATENT DOCUMENTS

| | | | |
|---|---|---|---|
| 6,199,179 B1 * | 3/2001 | Kauffman et al. | 714/26 |
| 6,226,734 B1 * | 5/2001 | Kleinsorge et al. | 712/13 |
| 7,188,125 B1 * | 3/2007 | Karr | |
| 7,234,075 B2 * | 6/2007 | Sankaran et al. | 714/13 |
| 7,383,465 B1 * | 6/2008 | van Rietschote et al. | 714/13 |
| 7,389,313 B1 * | 6/2008 | Hsieh et al. | |
| 7,434,105 B1 * | 10/2008 | Rodriguez-Rivera et al. | 714/38 |
| 7,549,028 B2 * | 6/2009 | Thompson et al. | 711/162 |
| 7,580,918 B2 * | 8/2009 | Chang et al. | |
| 2001/0056425 A1 * | 12/2001 | Richard | 707/10 |
| 2002/0038296 A1 * | 3/2002 | Margolus et al. | 707/1 |
| 2002/0114341 A1 * | 8/2002 | Sutherland et al. | 370/428 |
| 2002/0129264 A1 * | 9/2002 | Rowland et al. | 713/200 |
| 2002/0144069 A1 * | 10/2002 | Arakawa et al. | 711/162 |
| 2008/0052327 A1 * | 2/2008 | Buah | 707/204 |

OTHER PUBLICATIONS

Commvault; "Continuous Data Replicator 7.0"; available at: http://www.commvault.com/pdf/DC_CDR_Overview.pdf; 6 pages; 2007.

* cited by examiner

*Primary Examiner* — Susan Chen
(74) *Attorney, Agent, or Firm* — Wilmer Cutler Pickering Hale and Dorr LLP

(57) ABSTRACT

Techniques for backing up replicated data are disclosed. In one particular exemplary embodiment, the techniques may be realized as a method for backing up replicated data comprising identifying replicated data on a primary node and a secondary node, and determining whether a backup is capable of being performed on the secondary node. In the event a backup is capable of being performed on the secondary node, the method may create a backup copy of the identified replicated data on the secondary node, and in the event a backup is not capable of being performed on the secondary node, the method may create a backup copy of the identified replicated data on the primary node.

20 Claims, 2 Drawing Sheets

TECHNIQUES FOR BACKING UP REPLICATED DATA

FIELD OF THE DISCLOSURE

The present disclosure relates generally to data backup and, more particularly, to techniques for backing up replicated data.

BACKGROUND OF THE DISCLOSURE

High availability computer clusters or other computer cluster configurations may use data storage shared among one or more nodes. Such configurations may imply that backups are taken from an active node which may maintain control over shared storage. Such configurations may also provide redundancy among nodes, but the shared storage may create a single point of failure. To avoid this single point of failure, some computer cluster configurations may utilize unshared storage which may be replicated between nodes. Other systems may utilize replicated data for redundancy, availability and for other purposes. Such data replication may eliminate shared storage as a single point of failure but may introduce a level of complexity. Backups may be run on an active and/or a primary node, as they are in shared storage configurations. However, it may be desirable to run a backup on a passive and/or a secondary node, which may be possible due to unshared replicated storage.

Coordination of a backup between multiple nodes utilizing replicated data may present significant challenges. Storage on a node may not be replicated data, it may be local data utilized by the node. An application administrator, a network administrator or another user may determine whether storage, such as a particular volume used for application data, should be replicated. Specifying that storage should be replicated may result in the storage being replicated from the primary and/or active node to one or more secondary and/or passive nodes. Performing a full backup of storage on a device or a file system may result in backing up storage which is not replicated, together with replicated storage. Performing a backup on a secondary and/or passive node may result in incomplete or inconsistent backups if a node or a component of a replication process is not replicating data properly. Performing a backup on a secondary and/or passive node may fail if the secondary and/or passive node is not available to perform a backup. Performing a backup on a primary and/or active node and a secondary and/or passive node may create multiple backups and a user may be required to choose between the backups. Performing multiple backups also may fail to alleviate any burden off of a primary and/or active node and may require additional space and resources.

In view of the foregoing, it may be understood that there are significant problems and shortcomings associated with current technologies utilized for backing up replicated data.

SUMMARY OF THE DISCLOSURE

Techniques for backing up replicated data are disclosed. In one particular exemplary embodiment, the techniques may be realized as a method for backing up replicated data comprising identifying replicated data on a primary node and a secondary node, and determining whether a backup is capable of being performed on the secondary node. In the event a backup is capable of being performed on the secondary node, the method may create a backup copy of the identified replicated data on the secondary node, and in the event a backup is not capable of being performed on the secondary node, the method may create a backup copy of the identified replicated data on the primary node.

In accordance with other aspects of this particular exemplary embodiment, the techniques may be realized as an article of manufacture for backing up replicated data, the article of manufacture comprising at least one processor readable carrier, and instructions carried on the at least one carrier. The instructions may be configured to be readable from the at least one carrier by at least one processor and thereby cause the at least one processor to operate so as to identify replicated data on a primary node and a secondary node, determine whether a backup is capable of being performed on the secondary node. In the event a backup is capable of being performed on the secondary node, the processor may create a backup copy of the identified replicated data on the secondary node, and in the event a backup is not capable of being performed on the secondary node, the processor may create a backup copy of the identified replicated data on the primary node.

In accordance with further aspects of this particular exemplary embodiment, the techniques may be realized as a system for backing up unshared storage in a clustered environment comprising one or more processors communicatively coupled to a server. The server may be configured to identify replicated data on a primary node and a secondary node and determine whether a backup is capable of being performed on the secondary node. In the event a backup is capable of being performed on the secondary node, the server may create a backup copy of the identified replicated data on the secondary node, and in the event a backup is not capable of being performed on the secondary node, the server may create a backup copy of the identified replicated data on the primary node.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
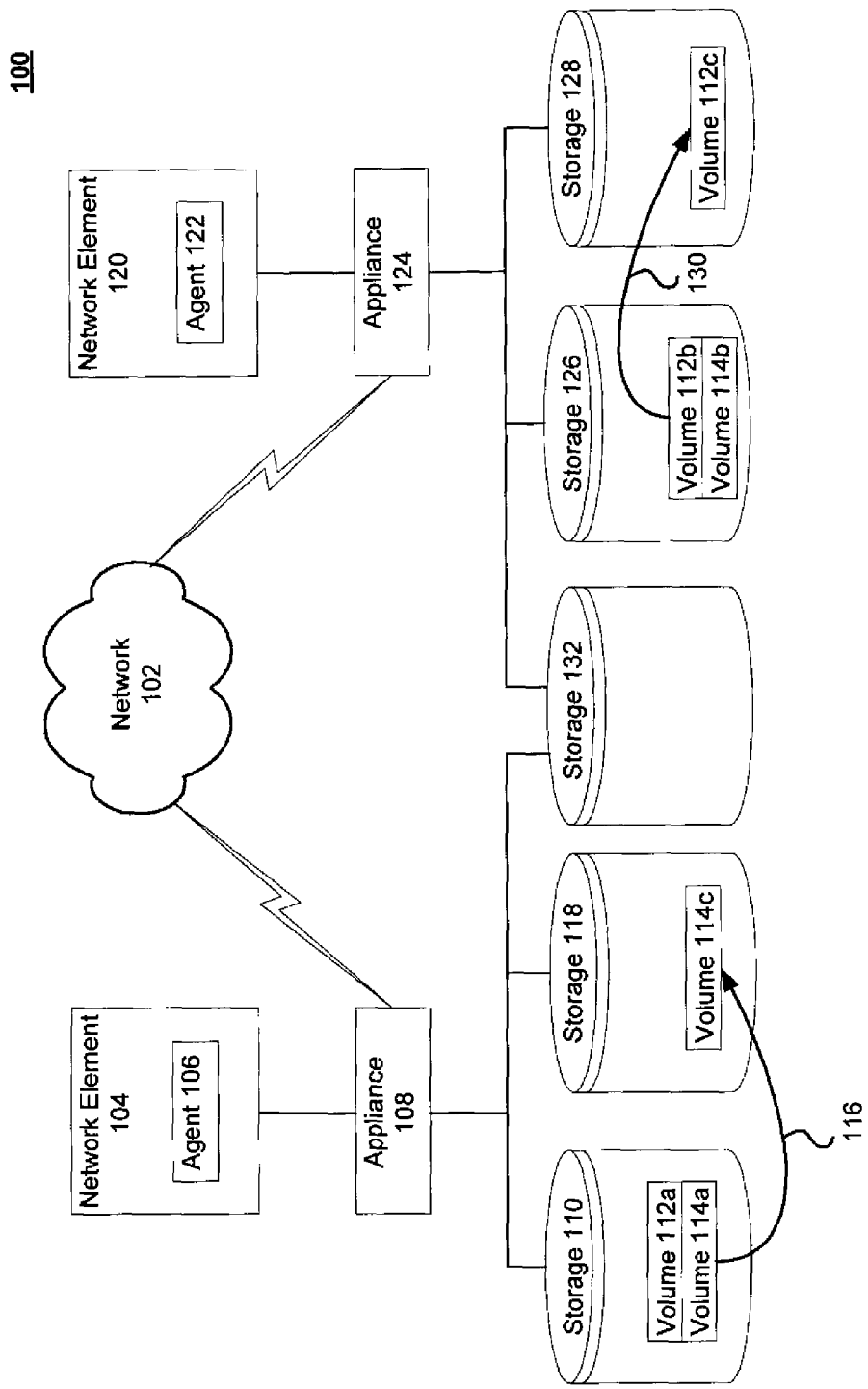
FIG. 1 shows a system 100 for backing up replicated data in accordance with an embodiment of the present disclosure.

Referring to FIG. 1, there is shown a system 100 for backing up replicated data in accordance with an embodiment of the present disclosure. FIG. 1 is a simplified view of system 100, which may include additional elements that are not depicted. Network elements 104 and 120 may be communicatively coupled to network 102 via appliances 108 and 124. Network elements 104 and 120 may contain agents 106 and 122. Appliance 108 may enable access to storage 110 and storage 118. Storage 110 may contain volumes 112*a* and 114*a*. Storage 118 may contain volume 114*c*. Backup job 116 may enable backup of data from storage 110 to storage 118. Appliance 124 may enable access to storage 126 and storage 128. Storage 126 may contain volumes 112*b* and 114*b*. Storage 128 may contain volume 112*c*. Backup job 130 may enable backup of data from storage 126 to storage 128. Storage 132 may be shared storage accessible via appliances 108 and 124.

Network 102 may be a local area network (LAN), a wide area network (WAN), the Internet, a cellular network, a satellite network, or another network that permits communication between network elements 104 and 120, appliances 108 and 124, and other devices communicatively coupled to network 102.

Network elements 104 and 120 may be application servers, backup servers, network storage devices or other devices communicatively coupled to network 102. Network elements 104 and 120 may utilize storage 110, 118, 126, and 128 for the storage of application data, backup data or other data. Network elements 104 and 120 may be nodes replicating data which may utilize storage 110, 118, 126, and 128 as storage. In some embodiments network elements 104 and 120 may use replication, but may not be clustered nodes. In one or more embodiments, network elements 104 and 120 may be nodes which may be part of a clustered environment.

Appliances 108 and 124 may be continuous data protection and replication (CDP/R) devices which may provide continuous data protection and replication (CDP/R) services to network elements 104 and 120. CDP/R services may be provided through the use of a network switch or may be provided through a continuous data protection and replication (CDP/R) appliance. In one or more embodiments, appliances 108 and 124 may represent a network switch, such as a fibre channel switch providing CDP/R services to network elements 104 and 120. Appliances 108 and 124 may be communicatively coupled to storage 110, 118, 126 and 128.

Storage 110, 118, 126, 128, and 132 may be local, remote, or a combination thereof to network elements 104 and 120. Storage 110, 118, 126, 128, and 132 may utilize a redundant array of inexpensive disks (RAID), a redundant array of inexpensive nodes (RAIN), tape, disk, or other computer accessible storage. In one or more embodiments storage 110, 118, 126, 128, and 132 may be a storage area network (SAN), an internet small computer systems interface (iSCSI) SAN, a Fibre Channel SAN, a common Internet file system (CIFS), network attached storage (NAS), or a network file system (NFS).

Storage 110, 118, 126, and 128 may contain volumes 112*a*, 114*a*, 114*c*, 112*b*, 114*b*, and 112*c*, respectively. Storage 110, 118, 126, and 128 may contain replicated data. In one or more embodiments, storage 110, 118, 126, and 128 may contain shared and/or unshared volumes. Storage 132 may represent shared storage accessible via appliances 108 and 124. In some embodiments, backups may be made to shared storage. Backups to shared storage may enable a restore process to ensure that a backup may be located in a single location regardless of whether a backup job is run on an active and/or primary node or a passive and/or secondary node.

Volumes 112*a*, 114*a*, 114*c*, 112*b*, 114*b*, and 112*c* may include data written by one or more applications hosted by network elements 104 and 120. Volumes 112*a*, 114*a*, 114*c*, 112*b*, 114*b*, and 112*c* may contain one or more user created data files such as, for example, a document, a list, an image file, an email, a posting, a web page, xml data, a sound file, and a video file. Volumes 112*a*, 114*a*, 114*c*, 112*b*, 114*b*, and 112*c* may contain data stored in one or more formats or data structures. Data structures may be determined by an underlying platform or system supporting an application. Volumes 112*a*, 114*a*, 114*c*, 112*b*, 114*b*, and 112*c* may be replicated data.

Backup job 116 may be a backup job running on network element 104 which may be capable of backing up one or more volumes, files, partitions, blocks or other units of data from storage 110 to storage 118. Backup job 130 may be a backup job running on network element 120 which may be capable of backing up one or more volumes, files, partitions, blocks or other units of data from storage 126 to storage 128. Backup jobs 116 and 130 may run independently of each other and may be capable of running on primary nodes, active nodes, secondary nodes and/or passive nodes. Backup jobs 116 and 130 may communicate with processes or resources, such as agents 106 and 122, to determine node status, data status and other factors relevant to backup jobs. Backup jobs 116 and 130 may be started by a single backup request on one node that may start a backup job on one or more active and/or primary nodes and a backup job on one or more passive and/or secondary nodes containing replicated data. Backup jobs 116 and 130 may be scheduled to run at the same time.

Agents 106 and 122 may perform job control of one or more backup jobs running on a node. Agents 106 and 122 may be one or more processes running on a node that may facilitate replication and/or clustering of one or more nodes. In one or more embodiments, agents 106 and 122 may be cluster agents and may coordinate a data protection application's activities between nodes. Agents 106 and 122 may be able to access one or more resources on a node. Agents 106 and 122 may be able to communicate with agents running on other nodes, directly, via a shared cluster resource, an Application Programming Interface (API), a Remote Procedure Call (RPC), an interface tables, a web service, Extensible Markup Language (XML) based interfaces, Simple Object Access Protocol (SOAP) based interfaces, common request broker architecture (CORBA) based interfaces, and/or other interfaces for sending or receiving information.

Backup jobs 116 and 130 may utilize agents 106 and 122 to determine one or more environment conditions. For example, network element 104 may be an active node in a clustered environment. Backup job 116 may utilize agent 106 to determine if one or more portions of data, such as volumes 112*a* and 114*a*, are replicated and/or clustered data. Agent 106 may query one or more application instances and determine that one or more applications are clustered applications utilizing unshared data. An application instance may indicate to Agent 106 that it is a clustered application whose data is replicated among nodes in a cluster. For example, a Microsoft® Exchange Server may be running on network element 104 and volume 112*a* may contain unshared, clustered Microsoft® Exchange data. Volume 112*a* may replicated by appliance 108 across network 102 to appliance 124 and may be stored as volume 112*b* on storage 126. Network element 120 may be a passive node associated with storage 126. Volume 114*a* may be a second volume associated with a second clustered application. Volume 114*a* may replicated by appliance 108 across network 102 to appliance 124 and may be stored as volume 114*b* on storage 126. Agent 106 may inform backup job 116 that volumes 112*a* and 114*a* correspond to application instances which are unshared storage containing clustered data. Agent 106 and agent 130 may provide other information to one or more backup jobs. For example, agent 106 may inform backup job 116 that an application utilizing volume 112a is replicating properly. Agent 106 may be able to determine a replication status by querying an application instance, by monitoring one or more replication processes, by verifying a replication cache, by verifying a replication log, by utilizing an API, and/or by querying a replication appliance. Agent 106 may further inform backup job 116 that an application utilizing volume 114a is not replicating properly. Backup job 116 may determine not to backup volume 112a since it is being replicated properly and a backup may be taken on a passive node. Backup job 116 may backup volume 114a to volume 114c on storage 118, based on the information received from agent 106 indicating that an application utilizing volume 114a is not replicating properly. In one or more embodiments, a user may specify a preference for where a backup job runs. A user may submit a backup job specifying that the backup job should run on the active node only, the passive node only, the primary node only, the secondary node only, the primary node only if the secondary node is not available, or the active node only if the passive node is not available. In other embodiments, a user may specify other conditions, such as backup on a passive and/or secondary node if an active and/or primary node condition or threshold, such as CPU utilization is met or exceeded. Backup job 116 may verify that a setting on a backup job or other conditions permit backup on an active and/or primary node. Volume 114b may be a volume containing data which has not properly and/or recently replicated from volume 114a.

Agent 122 may provide backup job 130 with information regarding replicated application data associated with one or more application instances on network element 120. Agent 122 may determine that an application instance running on network element 120 and utilizing volume 112b is replicating properly. Backup job 130 may receive this information and may determine that a backup may be completed on network element 120. Backup job 130 may backup volume 112b from storage 126 to volume 112c on storage 128. Performing a backup of volume 112b on network element 120 may enable off host backup of the application data in volume 112a by enabling a passive and/or secondary node to perform a backup on replicated data. Enabling a passive and/or secondary node to backup replicated data may reduce a processing or computational load on an active and/or primary node. Enabling a passive and/or secondary node to backup replicated data may reduce input/output (I/O) traffic on an active and/or primary node. Running multiple backup jobs may enable a backup job on a passive and/or secondary node to begin backing up data without waiting for a command from an active and/or primary node. Running multiple backup jobs may enable a backup job on an active and/or primary node to terminate once it has determined that replication is occurring properly and may thus reduce a load on an active and/or primary node. Backup on a passive and/or secondary node may also reduce data loss which may otherwise occur due to a delay in a backup job processed on an active and/or primary node. An active and/or primary node controller may not respond as quickly to a connection loss or failover condition as a passive and/or primary node controller. The delay in response time when utilizing an active and/or primary node controller to perform a backup may result in lost backup data.

Backup job 130 may determine not to backup volume 114b based at least in part on information received from agent 122 indicating that an application utilizing volume 114b is not replicating properly. Backup job 130 may verify one or more backup job settings prior to determining not to backup volume 114b. A user submitting a job may specify that a backup job may be performed on an active node only, a primary node only, a passive node only, a secondary node only, an active node if a passive node may not perform a backup, or a primary node if a secondary node may not perform a backup. In some embodiments, if a backup job determines that a backup may not be performed on an active and/or primary node, a backup may be run on data existing on the passive and/or secondary node. In one or more embodiments, if a backup may not be performed on a passive node and/or secondary node, the backup may fail. The backup job may provide notifications, error messages or other information related to the failure. Backup job 130 may verify additional conditions of a passive and/or secondary node prior to performing a backup, such as, but not limited to, node availability, available memory, available storage associated with a node, a current node status or other conditions related to a node or associated storage.

A backup job may create backup data and metadata. Metadata may be information relating to the structure or other details of the backup data which may be stored with the backup data. Metadata may enable navigation of backup data for a recovery process. Metadata may enable granular recovery of backed up application data.

Figure 2:
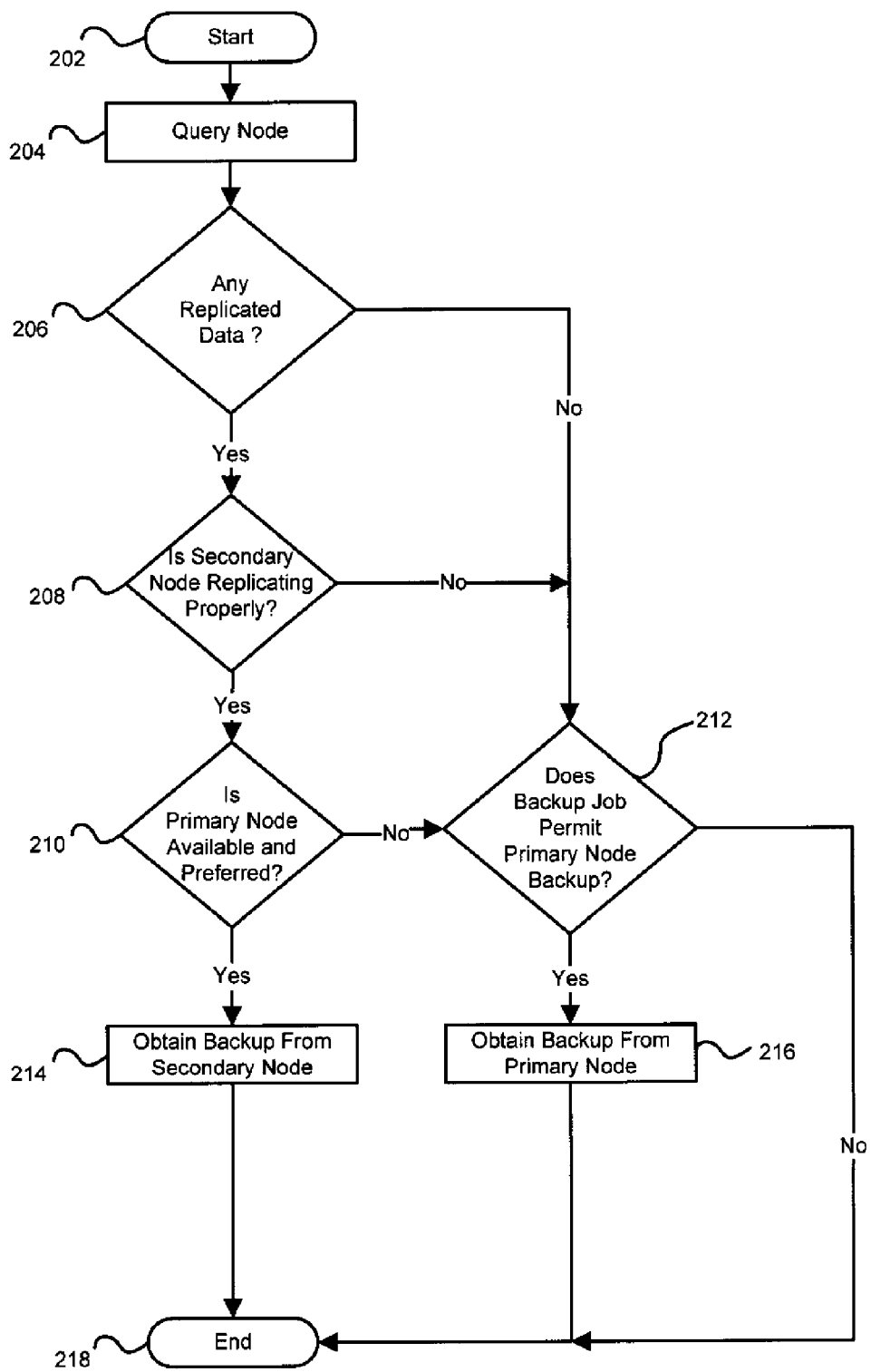
FIG. 2 shows a method 200 for backing up replicated data in accordance with an embodiment of the present disclosure.

Referring to FIG. 2, there is shown a method 200 for backing up storage containing replicated data in accordance with an embodiment of the present disclosure. At block 202, the method 200 for backing up storage containing replicated data, in accordance with an exemplary embodiment, may begin.

At block 204, a node a backup job is running on may be queried to determine one or more criteria related to data to be backed up. Multiple backup jobs may be running on similar schedules on multiple nodes. For example, a backup job running on a secondary node may query the secondary node, while a backup job, which is running on a primary node from which the secondary node's data is replicated, may query the primary node.

At block 206, it may be determined whether any replicated data exists on the node. A backup job may query an agent or other process running on a node or other network element associated with the backup job. The agent may query one or more application instances to determine if an application is utilizing replicated data. If an application or other process is utilizing storage containing replicated data, the method may continue at block 208. If storage containing replicated data is not being utilized, the method may continue at block 212.

At block 208, it may be determined whether data is being properly replicated to a secondary node. If data is not being properly replicated to a secondary node, the method may continue at block 212. If data is being properly replicated to a secondary node, the method may continue at block 210.

At block 210, it may be determined whether a secondary node is available to perform a backup and preferred by the backup job settings. If the secondary node is available to perform a backup and preferred by the settings in the backup job, the method 200 may continue at block 214. If the secondary node is not available to perform a backup or is not preferred, the method may continue at block 212.

At block 212, it may be determined whether a backup job permits a backup to be performed on a primary node. If a backup job permits backup on an primary node or if a backup job requires a backup to be performed on a primary node, the method may continue at block 216. If a backup job does not permit backup on a primary node, the method 200 continue at block 218.

At block 214, storage containing replicated data may be backed up on a secondary node.

At block 216, storage containing replicated data that may not be capable of being backed up on a secondary node may be backed up on the primary node.

At block 218, the method 200 may end.

At this point it should be noted that backing up replicated data in accordance with the present disclosure as described above typically involves the processing of input data and the generation of output data to some extent. This input data processing and output data generation may be implemented in hardware or software. For example, specific electronic components may be employed in a server or similar or related circuitry for implementing the functions associated with backup job control in accordance with the present disclosure as described above. Alternatively, one or more processors operating in accordance with stored instructions may implement the functions associated with backup job control in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for backing up replicated data comprising:
   identifying, using at least one computer processor, a first copy of the replicated data in a first unshared storage device associated with a primary node and a second copy of the replicated data in a second unshared storage device associated with a secondary node;
   determining whether a backup of the replicated data is capable of being performed on the secondary node, wherein determining whether a backup of the replicated data is capable of being performed on the secondary node is made independently on both the primary node and the secondary node;
   in the event a backup of the replicated data is capable of being performed on the secondary node, creating a backup copy of the second copy of the replicated data associated with the secondary node by the secondary node performing a backup; and
   in the event a backup of the replicated data is not capable of being performed on the secondary node, creating a backup copy of the first copy of the replicated data associated with the primary node by the primary node performing a backup.

2. The method of claim 1, wherein the primary node comprises an active node in a cluster and the secondary node comprises a passive node in the cluster.

3. The method of claim 1, wherein performing a backup on the secondary node reduces at least one of a computational load and an input/output load on the primary node.

4. The method of claim 1, wherein determining whether a backup is capable of being performed on the secondary node comprises determining whether the secondary node is available for backup.

5. The method of claim 1, further comprising enabling a user to specify whether a backup is permitted on the primary node only, the secondary node only, or the primary node in the event the secondary node is not available.

6. The method of claim 4, wherein a backup job determines that the secondary node is not available for backup due to a replication error.

7. The method of claim 1, wherein running independent backup jobs on the primary node and the secondary node of the replicated data reduces data loss in the event of a connection failure.

8. The method of claim 1, wherein an agent running on a node queries an application instance to determine whether it is replicating properly.

9. The method of claim 1, wherein a backup job running on a node utilizes an agent on the node to query an application instance to determine whether application data is replicated.

10. The method of claim 1, wherein the backup copy of the replicated data creates application specific metadata, and wherein the metadata facilitates granular recovery of application data.

11. At least one non-transitory processor readable storage medium for storing a computer program of instructions configured to be readable by at least one processor for instructing the at least one processor to execute a computer process for performing the method as recited in claim 1.

12. An article of manufacture for backing up replicated data, the article of manufacture comprising:
    at least one non-transitory processor readable storage medium; and
    instructions carried on the at least one storage medium;
    wherein the instructions are configured to be readable from the at least one storage medium by at least one processor and thereby cause the at least one processor to operate so as to:
        identify a first copy of the replicated data in a first unshared storage device associated with a primary node and a second copy of the replicated data in a second unshared storage device associated with a secondary node;
        determine whether a backup of the replicated data is capable of being performed on the secondary node, wherein determining whether a backup of the replicated data is capable of being performed on the secondary node is made independently on both the primary node and the secondary node;
        in the event a backup of the replicated data is capable of being performed on the secondary node, creating a backup copy of the second copy of the replicated data associated with the secondary node by the secondary node performing a backup; and
        in the event a backup of the replicated data is not capable of being performed on the secondary node, creating a backup copy of the first copy of the replicated data associated with the primary node by the primary node performing a backup.

13. A system for backing up unshared storage in a clustered environment comprising:
    one or more processors communicatively coupled to a server; wherein the server is configured to:

identify a first copy of replicated data in a first unshared storage device associated with a primary node and a second copy of the replicated data in a second unshared storage device associated with a secondary node;

determine whether a backup of the replicated data is capable of being performed on the secondary node, wherein determining whether a backup of the replicated data is capable of being performed on the secondary node is made independently on both the primary node and the secondary node;

in the event a backup of the replicated data is capable of being performed on the secondary node, creating a backup copy of the second copy of the replicated data associated with the secondary node by the secondary node performing a backup; and in the event a backup of the replicated data is not capable of being performed on the secondary node, creating a backup copy of the first copy of the replicated data associated with the primary node by the primary node performing a backup.

14. The system of claim 13, wherein performing a backup on the secondary node reduces at least one of a computational load and an input/output load on an primary node.

15. The system of claim 13, wherein the server is further configured to: determine whether a secondary node is available to perform a backup.

16. The system of claim 13, wherein running independent backup jobs on the primary node and the secondary node of a volume of replicated application data reduces data loss in the event of a connection failure.

17. The system of claim 13, wherein running a plurality of independent backup jobs on a plurality of nodes is initiated by a single backup request from a user and wherein a single backup copy of replicated application data is produced regardless of the number of copies of the replicated data.

18. The system of claim 17, wherein the replicated data comprises application data from a single application.

19. The system of claim 13, wherein an agent running on a node queries an application instance to determine whether an application utilizes replicated data.

20. The method of claim 8, wherein a replication status is determined by at least one of: verifying a replication cache, querying an application instance, monitoring one or more replication processes, verifying a replication log, and utilizing an API.

* * * * *